(12) United States Patent
Koli

(10) Patent No.: US 9,641,362 B2
(45) Date of Patent: May 2, 2017

(54) N-WIRE TWO-LEVEL DIGITAL INTERFACE

(71) Applicant: Optis Circuit Technology, LLC, Plano, TX (US)

(72) Inventor: Kimmo Koli, Turku (FI)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 0 days.

(21) Appl. No.: 14/891,454

(22) PCT Filed: Jun. 17, 2014

(86) PCT No.: PCT/EP2014/062778
§ 371 (c)(1),
(2) Date: Nov. 17, 2015

(87) PCT Pub. No.: WO2014/202642
PCT Pub. Date: Dec. 24, 2014

(65) Prior Publication Data
US 2016/0127158 A1   May 5, 2016

(30) Foreign Application Priority Data

Jun. 17, 2013  (EP) .................................. 13172354

(51) Int. Cl.
*H04L 27/00* (2006.01)
*H04L 25/49* (2006.01)
(Continued)

(52) U.S. Cl.
CPC ........... *H04L 25/4917* (2013.01); *H04B 7/06* (2013.01); *H04L 25/0272* (2013.01); *H04L 25/0292* (2013.01)

(58) Field of Classification Search
CPC .... H04B 7/06; H04L 25/0272; H04L 25/0292
(Continued)

(56) References Cited

U.S. PATENT DOCUMENTS 6,278,740 B1 * 8/2001 Nordyke ................... H04L 5/20
327/63
6,571,016 B1 * 5/2003 Mehrotra ............. H04N 19/119
375/240.13

(Continued)

FOREIGN PATENT DOCUMENTS

WO    2008/151251 A1   12/2008

OTHER PUBLICATIONS

International Search Report issued in corresponding International application No. PCT/EP2014/062778, date of completion of the International search Jul. 10, 2014.
(Continued)

*Primary Examiner* — Leila Malek
(74) *Attorney, Agent, or Firm* — The Danamraj Law Group, P.C.; Thomas L. Crisman; Kenneth A. McClure

(57) ABSTRACT

A receiver for an N-wire digital interface, where N is any integer exceeding two, has N input terminals, a common node and N detection stages. Each of the N detection stages has a resistive element coupled between the common node and a respective one of the N input terminals, and a comparator having a first input coupled to the respective one of the N input terminals and a second input coupled to the common node.

15 Claims, 10 Drawing Sheets

(51) Int. Cl.
*H04L 25/02* (2006.01)
*H04B 7/06* (2006.01)

(58) Field of Classification Search
USPC .................................................. 375/259, 340
See application file for complete search history.

(56) References Cited

U.S. PATENT DOCUMENTS

2004/0258165 A1* 12/2004 Peltonen .................. H04B 3/54
375/257
2008/0304578 A1* 12/2008 Matsubara ............... H04B 3/30
375/257

OTHER PUBLICATIONS

Written Opinion of the International Searching Authority issued in corresponding International application No. PCT/EP2014/062778, date of mailing of the International Search Report Jul. 18, 2014.
Demmerle, Frank "Integrated RF-CMOS Transceivers challenge RF Test," 2006 IEEE International Test Conference (ITC), Santa Clara, California, USA, Oct. 1, 2006, pp. 1-8, Print ISBN: 978-1-4244-0292-1, DOI: 10.1109/TEST.2006.297704.
Extended European Search Report issued in corresponding European application No. EP 13 17 2354, date of completion of the search Sep. 12, 2013.

* cited by examiner

| | | 1 | 2 | 3 | 4 | 5 | 6 |
|---|---|---|---|---|---|---|---|
| Transmit Bits | $X_{TX}$<br>$Y_{TX}$<br>$Z_{TX}$ | 1<br>0<br>0 | 1<br>1<br>0 | 0<br>1<br>0 | 0<br>1<br>1 | 0<br>0<br>1 | 1<br>0<br>1 |
| Signalling Voltages | $V_X$<br>$V_Y$<br>$V_Z$ | V<br>-V<br>-V | V<br>V<br>-V | -V<br>V<br>-V | -V<br>V<br>V | -V<br>-V<br>V | V<br>-V<br>V |
| Signalling Currents | $I_X$<br>$I_Y$<br>$I_Z$ | 2I<br>-I<br>-I | I<br>I<br>-2I | -I<br>2I<br>-I | -2I<br>I<br>I | -I<br>-I<br>2I | I<br>-2I<br>I |
| Comparator Voltages | $V_{CX}$<br>$V_{CY}$<br>$V_{CZ}$ | 4V/3<br>-2V/3<br>-2V/3 | 2V/3<br>2V/3<br>-4V/3 | -2V/3<br>4V/3<br>-2V/3 | -4V/3<br>2V/3<br>2V/3 | -2V/3<br>-2V/3<br>4V/3 | 2V/3<br>-4V/3<br>2V/3 |
| Received Bits | $X_{RX}$<br>$Y_{RX}$<br>$Z_{RX}$ | 1<br>0<br>0 | 1<br>1<br>0 | 0<br>1<br>0 | 0<br>1<br>1 | 0<br>0<br>1 | 1<br>0<br>1 |

FIG. 4

| | | \multicolumn{14}{c}{States} |
|---|---|---|---|---|---|---|---|---|---|---|---|---|---|---|

| | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Transmit Bits | $W_{TX}$ | 0 | 0 | 0 | 1 | 1 | 1 | 0 | 0 | 0 | 1 | 1 | 1 | 1 | 0 |
| | $X_{TX}$ | 0 | 1 | 1 | 0 | 0 | 1 | 0 | 0 | 1 | 0 | 1 | 1 | 0 | 1 |
| | $Y_{TX}$ | 1 | 0 | 1 | 0 | 1 | 0 | 0 | 1 | 0 | 0 | 1 | 0 | 1 | 1 |
| | $Z_{TX}$ | 1 | 1 | 0 | 1 | 0 | 0 | 1 | 0 | 0 | 0 | 0 | 1 | 1 | 1 |
| Signalling Voltages | $V_W$ | $-V$ | $-V$ | $-V$ | $V$ | $V$ | $V$ | $-V$ | $-V$ | $-V$ | $V$ | $V$ | $V$ | $V$ | $-V$ |
| | $V_X$ | $-V$ | $V$ | $V$ | $-V$ | $-V$ | $V$ | $-V$ | $-V$ | $V$ | $-V$ | $V$ | $V$ | $-V$ | $V$ |
| | $V_Y$ | $V$ | $-V$ | $V$ | $-V$ | $V$ | $-V$ | $-V$ | $V$ | $-V$ | $-V$ | $V$ | $-V$ | $V$ | $V$ |
| | $V_Z$ | $V$ | $V$ | $-V$ | $V$ | $-V$ | $-V$ | $V$ | $-V$ | $-V$ | $-V$ | $-V$ | $V$ | $V$ | $V$ |
| Signalling Currents | $I_W$ | $-2I$ | $-2I$ | $-2I$ | $2I$ | $2I$ | $2I$ | $-I$ | $-I$ | $-I$ | $3I$ | $I$ | $I$ | $I$ | $-3I$ |
| | $I_X$ | $-2I$ | $2I$ | $2I$ | $-2I$ | $-2I$ | $2I$ | $-I$ | $-I$ | $3I$ | $-I$ | $I$ | $I$ | $-3I$ | $I$ |
| | $I_Y$ | $2I$ | $-2I$ | $2I$ | $-2I$ | $2I$ | $-2I$ | $-I$ | $3I$ | $-I$ | $-I$ | $I$ | $-3I$ | $I$ | $I$ |
| | $I_Z$ | $2I$ | $2I$ | $-2I$ | $2I$ | $-2I$ | $-2I$ | $3I$ | $-I$ | $-I$ | $-I$ | $-3I$ | $I$ | $I$ | $I$ |
| Comparator Voltages | $V_{CW}$ | $-V$ | $-V$ | $-V$ | $V$ | $V$ | $V$ | $-V/2$ | $-V/2$ | $-V/2$ | $3V/2$ | $V/2$ | $V/2$ | $V/2$ | $-3V/2$ |
| | $V_{CX}$ | $-V$ | $V$ | $V$ | $-V$ | $-V$ | $V$ | $-V/2$ | $-V/2$ | $3V/2$ | $-V/2$ | $V/2$ | $V/2$ | $-3V/2$ | $V/2$ |
| | $V_{CY}$ | $V$ | $-V$ | $V$ | $-V$ | $V$ | $-V$ | $-V/2$ | $3V/2$ | $-V/2$ | $-V/2$ | $V/2$ | $-3V/2$ | $V/2$ | $V/2$ |
| | $V_{CZ}$ | $V$ | $V$ | $-V$ | $V$ | $-V$ | $-V$ | $3V/2$ | $-V/2$ | $-V/2$ | $-V/2$ | $-3V/2$ | $V/2$ | $V/2$ | $V/2$ |
| Received Bits | $W_{RX}$ | 0 | 0 | 0 | 1 | 1 | 1 | 0 | 0 | 0 | 1 | 1 | 1 | 1 | 0 |
| | $X_{RX}$ | 0 | 1 | 1 | 0 | 0 | 1 | 0 | 0 | 1 | 0 | 1 | 1 | 0 | 1 |
| | $Y_{RX}$ | 1 | 0 | 1 | 0 | 1 | 0 | 0 | 1 | 0 | 0 | 1 | 0 | 1 | 1 |
| | $Z_{RX}$ | 1 | 1 | 0 | 1 | 0 | 0 | 1 | 0 | 0 | 0 | 0 | 1 | 1 | 1 |

FIG. 6

| | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Transmit Bits | $U_{TX}$ | 0 | 0 | 0 | 1 | 1 | 1 | 1 | 1 | 0 | 0 | 0 | 0 | 1 | 0 | 1 | 1 | 1 | 0 | 1 | 0 |
| | $W_{TX}$ | 0 | 0 | 1 | 1 | 0 | 1 | 1 | 0 | 0 | 1 | 0 | 1 | 0 | 1 | 0 | 1 | 0 | 1 | 0 | 1 |
| | $X_{TX}$ | 0 | 1 | 1 | 0 | 0 | 1 | 0 | 0 | 1 | 1 | 1 | 0 | 1 | 0 | 0 | 0 | 1 | 0 | 1 | 1 |
| | $Y_{TX}$ | 1 | 1 | 0 | 0 | 0 | 0 | 0 | 1 | 1 | 1 | 0 | 1 | 0 | 0 | 1 | 1 | 0 | 1 | 1 | 0 |
| | $Z_{TX}$ | 1 | 0 | 0 | 0 | 1 | 0 | 1 | 1 | 1 | 0 | 1 | 0 | 0 | 1 | 0 | 0 | 1 | 1 | 0 | 1 |
| Signalling Voltages | $V_U$ | -V | -V | -V | V | V | V | V | V | -V | -V | -V | -V | V | -V | V | V | V | -V | V | -V |
| | $V_W$ | -V | -V | V | V | -V | V | V | -V | -V | V | -V | V | -V | V | -V | V | -V | V | -V | V |
| | $V_X$ | -V | V | V | -V | -V | V | -V | -V | V | V | V | -V | V | -V | -V | -V | V | -V | V | V |
| | $V_Y$ | V | V | -V | -V | -V | -V | -V | V | V | V | -V | V | -V | -V | V | V | -V | V | V | -V |
| | $V_Z$ | V | -V | -V | -V | V | -V | V | V | V | -V | V | -V | -V | V | -V | -V | V | V | -V | V |
| Signalling Currents | $I_U$ | -2I | -2I | -2I | 3I | 3I | 2I | 2I | 2I | -3I | -3I | -2I | -2I | 3I | -2I | 3I | 2I | 2I | -3I | 2I | -3I |
| | $I_W$ | -2I | -2I | 3I | 3I | -2I | 2I | 2I | -3I | -3I | 2I | -2I | 3I | -2I | 3I | -2I | 2I | -3I | 2I | -3I | 2I |
| | $I_X$ | -2I | 3I | 3I | -2I | -2I | 2I | -3I | -3I | 2I | 2I | 3I | -2I | 3I | -2I | -2I | -3I | 2I | -3I | 2I | 2I |
| | $I_Y$ | 3I | 3I | -2I | -2I | -2I | -3I | -3I | 2I | 2I | 2I | -2I | 3I | -2I | -2I | 3I | 2I | -3I | 2I | 2I | -3I |
| | $I_Z$ | 3I | -2I | -2I | -2I | 3I | -3I | 2I | 2I | 2I | -3I | 3I | -2I | -2I | 3I | -2I | -2I | 2I | 2I | -3I | 2I |
| Comparator Voltages | $V_{CU}$ | -4V/5 | -4V/5 | -4V/5 | 6V/5 | 6V/5 | 4V/5 | 4V/5 | 4V/5 | -6V/5 | -6V/5 | -4V/5 | -4V/5 | 6V/5 | -4V/5 | 6V/5 | 4V/5 | 4V/5 | -6V/5 | 4V/5 | -6V/5 |
| | $V_{CW}$ | -4V/5 | -4V/5 | 6V/5 | 6V/5 | -4V/5 | 4V/5 | 4V/5 | -6V/5 | -6V/5 | 4V/5 | -4V/5 | 6V/5 | -4V/5 | 6V/5 | -4V/5 | 4V/5 | -6V/5 | 4V/5 | -6V/5 | 4V/5 |
| | $V_{CX}$ | -4V/5 | 6V/5 | 6V/5 | -4V/5 | -4V/5 | 4V/5 | -6V/5 | -6V/5 | 4V/5 | 4V/5 | 6V/5 | -4V/5 | 6V/5 | -4V/5 | -4V/5 | -6V/5 | 4V/5 | -6V/5 | 4V/5 | 4V/5 |
| | $V_{CY}$ | 6V/5 | 6V/5 | -4V/5 | -4V/5 | -4V/5 | -6V/5 | -6V/5 | 4V/5 | 4V/5 | 4V/5 | -4V/5 | 6V/5 | -4V/5 | -4V/5 | 6V/5 | 4V/5 | -6V/5 | 4V/5 | 4V/5 | -6V/5 |
| | $V_{CZ}$ | 6V/5 | -4V/5 | -4V/5 | -4V/5 | 6V/5 | -6V/5 | 4V/5 | 4V/5 | 4V/5 | -6V/5 | 6V/5 | -4V/5 | -4V/5 | 6V/5 | -4V/5 | -4V/5 | 4V/5 | 4V/5 | -6V/5 | 4V/5 |
| Received Bits | $U_{RX}$ | 0 | 0 | 0 | 1 | 1 | 1 | 1 | 1 | 0 | 0 | 0 | 0 | 1 | 0 | 1 | 1 | 1 | 0 | 1 | 0 |
| | $W_{RX}$ | 0 | 0 | 1 | 1 | 0 | 1 | 1 | 0 | 0 | 1 | 0 | 1 | 0 | 1 | 0 | 1 | 0 | 1 | 0 | 1 |
| | $X_{RX}$ | 0 | 1 | 1 | 0 | 0 | 1 | 0 | 0 | 1 | 1 | 1 | 0 | 1 | 0 | 0 | 0 | 1 | 0 | 1 | 1 |
| | $Y_{RX}$ | 1 | 1 | 0 | 0 | 0 | 0 | 0 | 1 | 1 | 1 | 0 | 1 | 0 | 0 | 1 | 1 | 0 | 1 | 1 | 0 |
| | $Z_{RX}$ | 1 | 0 | 0 | 0 | 1 | 0 | 1 | 1 | 1 | 0 | 1 | 0 | 0 | 1 | 0 | 0 | 1 | 1 | 0 | 1 |

States

FIG. 8

N-WIRE TWO-LEVEL DIGITAL INTERFACE

FIELD OF THE DISCLOSURE

The present disclosure relates to a receiver for an N-wire digital interface, a signalling system comprising the receiver, a wireless communication device comprising the signalling system, and a method of operating a signalling system.

BACKGROUND TO THE DISCLOSURE

The digital interface between radio frequency integrated circuits (RFICs) and baseband integrated circuits (BBIC) has to support increasingly high data rates with wireless communication standards such as the Third Generation Partnership Project (3GPP) Long Term Evolution (LTE) standard employing carrier aggregation. Digital interface standards are specified by the Mobile Industry Processor Interface (MIPI) Alliance. The current MIPI DigRF v4 draft interface requires a 5.2 GHz clock for transmitting data in the LTE 20+20+20 case, denoting aggregation of three 20 MHz portions of spectrum, rendering the physical implementation very challenging. These extremely high clock rates are required because the clock and data is transmitted with a single differential line. As an alternative, a three-wire interface is under consideration by the MIPI Alliance. This alternative interface uses three-level signals transmitted over three wires resulting in six unique states for data coding, so that theoretically $\log_2(6)$ bits≈2.585 bits can be transmitted with three wires in one data transmission cycle. If the data is forced to change state every data transmission cycle, five unique states can be used to transfer theoretically $\log_2(5)$ bits≈2.322 bits of data, while also a clock signal can be extracted from the changes in the transmitted signals. Furthermore, by permitting the data to change at both the rising and falling edges of a clock signal, a technique known as Double Data Rate (DDR), the data rate can be further doubled. However, the high bit rates required for the LTE carrier aggregation modes push the operating frequencies of the phase locked loop employed for clock synchronisation into the same range as employed by a frequency synthesiser incorporated in the RFIC. This means that the power consumption of the phase locked loop becomes comparable to the power consumption of the RFIC frequency synthesiser. Moreover, special radio frequency (RF) device modelling, and even special RF devices, such as varactors, are required to implement DigRF v4. In addition, known three-wire digital interfaces require a non-zero voltage difference between each pair of the wires.

The tri-state driver 10 illustrated in FIG. 1 may be used to drive a three-wire interface. The tri-state driver 10 comprises a NAND gate having a first input coupled to a first driver input EN and a second input coupled to a second driver input A. The tri-state driver 10 also comprises a NOR gate having a first input B coupled to the first driver input EN by means of an inverter INV and a second input coupled to the second driver input A. An output C of the NAND gate is coupled to a gate of a p-channel metal oxide semiconductor field effect transistor (MOSFET) Q2, and an output D of the NOR gate is coupled to a gate of an n-channel MOSFET Q1. A drain of the p-channel MOSFET Q2 and a drain of the n-channel MOSFET are coupled to an output OUT of the tri-state driver 10.

Also illustrated in FIG. 1 is a state table of the tri-state driver 10, showing for all combinations of binary values L and H applied to the first and second driver inputs EN, A, binary values at the first input B of the NOR gate, and at the outputs C, D of the NAND gate and NOR gate. The state table also indicates whether the p-channel MOSFET Q2 and the n-channel MOSFET Q1 are switched on or off. When the p-channel MOSFET Q2 is switched on and the n-channel MOSFET Q1 is switched off, the output OUT of the tri-state driver 10 has a binary value H, the tri-state driver 10 is sourcing current, and its output impedance is low. When the p-channel MOSFET Q2 is switched off and the n-channel MOSFET Q1 is switched on, the output OUT of the tri-state driver 10 has a binary value L, the tri-state driver 10 is sinking current, and, again, its output impedance is low. When the p-channel MOSFET Q2 and the n-channel MOSFET Q1 are both switched off, the output OUT of the tri-state driver 10 is floating and has a high impedance. Therefore, the impedance presented to a three-wire interface by the tri-state driver 10 is signal dependent, which can result in inter-symbol interference, particularly at high signalling speeds.

A known signalling system using a three-wire interface is illustrated in FIG. 2, and comprises a transmitter (TX) coupled to a receiver (RX) by means of three wires E, F, G. At the transmitter, each of the three wires E, F, G is coupled to two drivers by means of source resistors $R_S$. At the receiver, each of the three wires E, F, G is terminated by a termination resistor $R_T$, and comparators monitor voltage differences between pairs of the three wires E, F, G. The transmitter illustrated in FIG. 2 can provide line termination also for the high impedance state, when the transmitter is neither sourcing or sinking current over a particular wire, but such a transmitter can consume a significant amount of power which is not transmitted to the receiver.

SUMMARY OF THE PREFERRED EMBODIMENTS

According to a first aspect there is provided a receiver for an N-wire digital interface, where N is any integer exceeding two, the receiver comprising:
N input terminals, a common node and N detection stages;
wherein each of the N detection stages comprises
a resistive element coupled between the common node and a respective one of the N input terminals, and
a comparator having a first input coupled to the respective one of the N input terminals and a second input coupled to the common node; and
wherein the resistive element of each of the detection stages has substantially the same resistance.

The receiver enables an N-wire digital interface to employ two-level signals which can provide low timing skew and low signal distortion using a simple transmitter with single ended drivers. Such a two-level driver can enable good impedance matching at the transmitter so that the receiver does not need to be matched. The resistive elements at the receiver can have high values, thereby reducing power consumption. Moreover, the receiver enables an N-wire digital interface to be terminated at both the transmitter and receiver with an impedance that is independent of the signals transmitted over the N-wire digital interface, thereby facilitating high speed operation. Current sourced from a transmitter to the receiver can be sunk back to the transmitter, thereby enabling high power efficiency. The topology of the receiver enables a low voltage swing at the common node, to which the comparators are coupled, thereby providing low timing skew, and avoids the need for a voltage reference, thereby enabling low complexity. In the present disclosure, the term wire is intended to indicate any electrical conductor.

The receiver may comprise a decoder coupled to an output of each of the N comparators and arranged to determine a received symbol dependent on a state of the N comparators. The decoder may comprise a first look-up table for mapping the state of the comparators to the received symbol.

In a first preferred embodiment of the receiver, N may be three, enabling up to six states to be distinguished. In a second preferred embodiment, N may be four, enabling up to fourteen states to be distinguished. In a third preferred embodiment, N may be five, enabling up to twenty states to be distinguished.

According to a second aspect there is provided a signalling system comprising a transmitter arranged to generate on each wire of an N-wire interface a signalling voltage indicative of a different one of N bits to be transmitted, wherein each of the N signalling voltages is selected from two values, and a receiver according to the first aspect having its N input terminals coupled to the N-wire interface.

The signalling system may comprise an encoder arranged to map a symbol to the N bits to be transmitted. The encoder may comprise a second look-up table for mapping the symbol to the N bits to be transmitted.

In a first preferred embodiment of the signalling system, N may be three, two of the three signalling voltages may have the same value, and a third one of the three signalling voltages may have a different value.

In a second preferred embodiment of the signalling system, N may be four, at least two of the four signalling voltages may have the same value, and the at least one other of the four signalling voltages may have a different value.

In a third preferred embodiment of the signalling system, N may be five, three of the five signalling voltages may have the same value, and the other two of the five signalling voltages may have a different value.

There is also provided a wireless communication device comprising a signalling system according to the second aspect.

According to a third aspect there is provided a method of operating a signalling system, comprising:
providing a receiver according to the first aspect;
selecting N signalling voltages, wherein each of the signalling voltages is selected from two values;
delivering the N signalling voltages to, respectively, the N input terminals of the receiver; and
determining a received symbol dependent on the N signalling voltages.

The method may comprise employing a look-up table for determining the received symbol dependent on the N signalling voltages.

In a first preferred embodiment of the method, N may be three, two of the three signalling voltages may have the same value, and a third one of the three signalling voltages may have a different value.

In a second preferred embodiment of the method, N may be four, at least two of the four signalling voltages may have the same value, and the at least one other of the four signalling voltages may have a different value.

In a third preferred embodiment of the method, N may be five, three of the five signalling voltages may have the same value, and the other two of the five signalling voltages may have a different value.

BRIEF DESCRIPTION OF THE DRAWINGS

Preferred embodiments will now be described, by way of example only, with reference to the accompanying drawings, in which:

FIG. 4 is a table of states of the signalling system of FIG. 3;
FIG. 6 is a table of states of the signalling system of FIG. 5;
FIG. 8 is a table of states of the signalling system of FIG. 7.

DETAILED DESCRIPTION OF PREFERRED EMBODIMENTS

Figure 1:
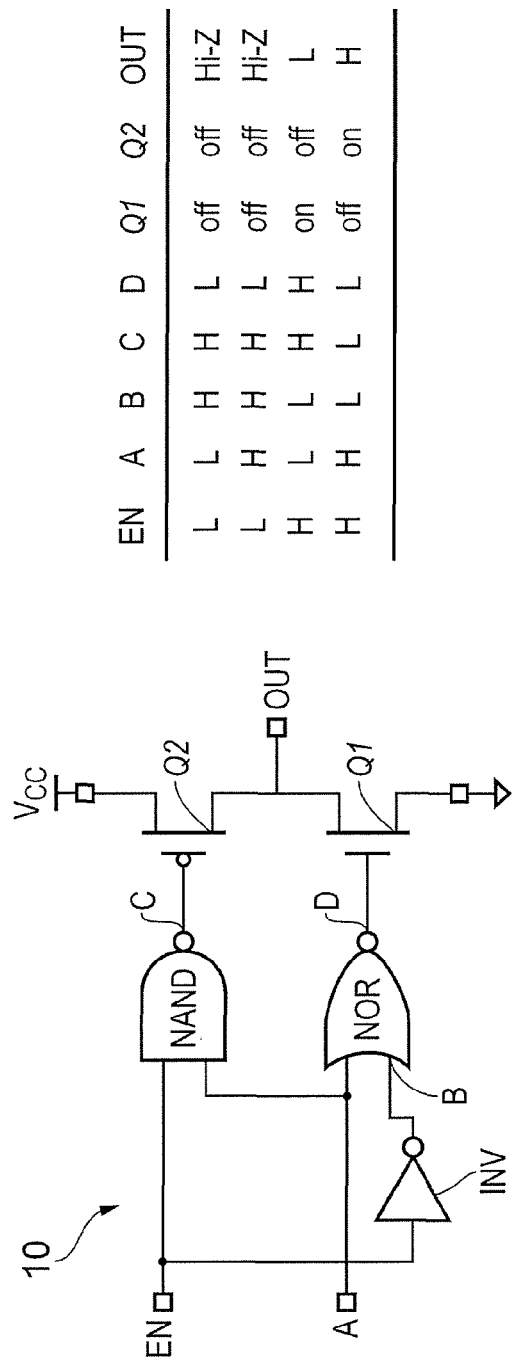
FIG. 1 is a schematic diagram of a known tri-state driver.
Figure 2:
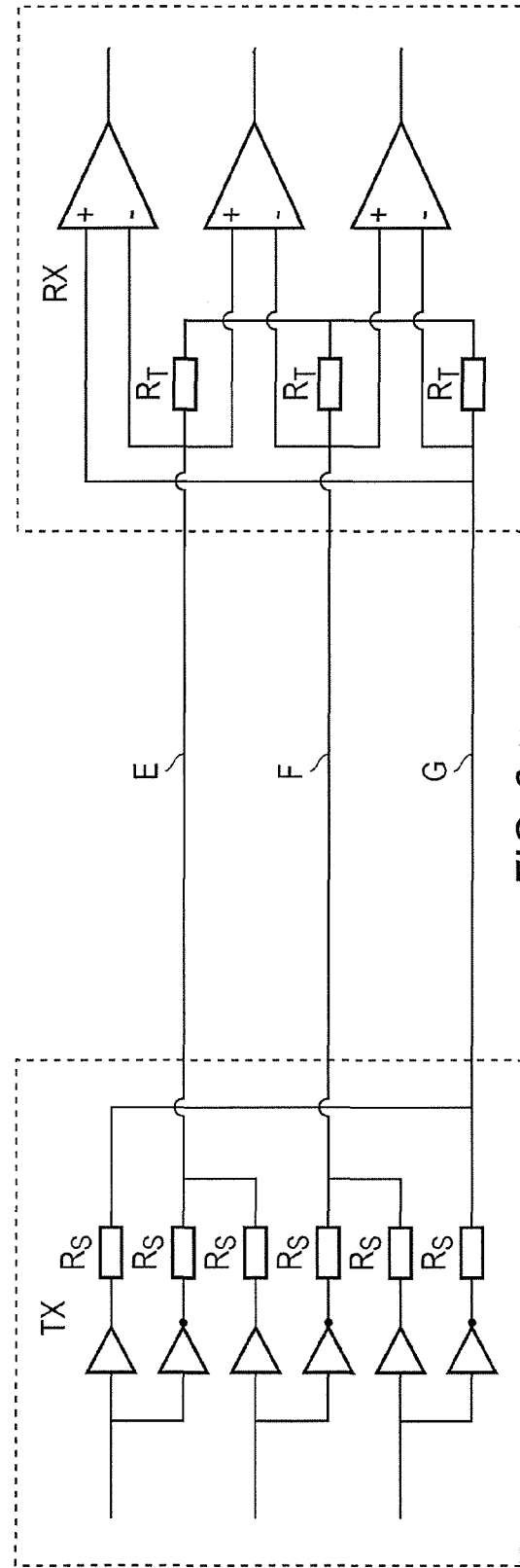
FIG. 2 is a schematic diagram of a known signalling system.
Figure 3:
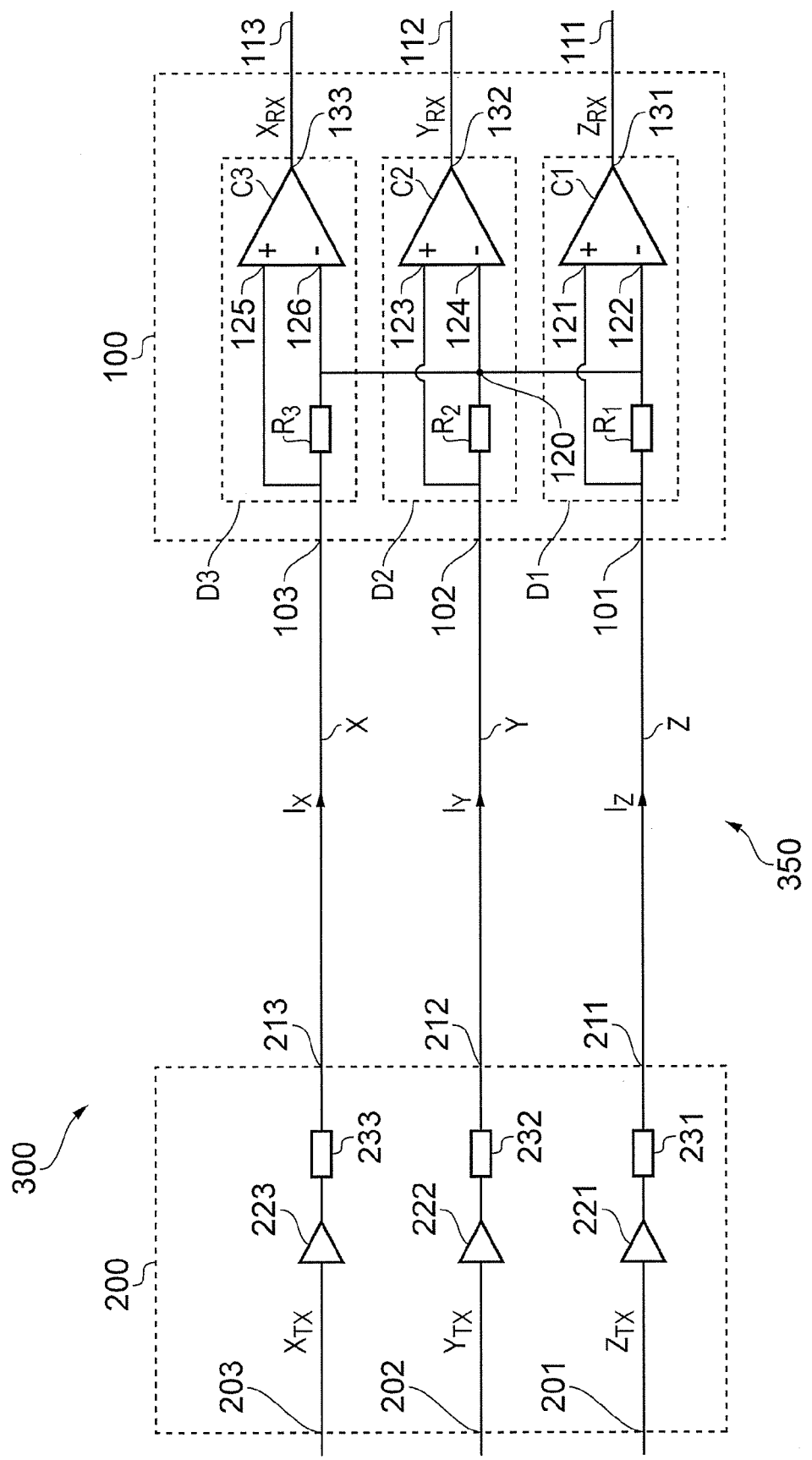
FIG. 3 is a schematic diagram of a signalling system comprising a three-wire digital interface.

Referring to FIG. 3, a signalling system 300 comprises a transmitter 200 coupled to a receiver 100 by means of a first wire Z, a second wire Y and a third wire X. The first, second and third wires Z, Y, X together are a three-wire digital interface 350. The transmitter 200 has a first transmitter input 201 for a first transmit bit $Z_{TX}$ of a symbol to be transmitted, a second transmitter input 202 for a second transmit bit $Y_{TX}$ of the symbol to be transmitted, and a third transmitter input 203 for a third transmit bit $X_{TX}$ of the symbol to be transmitted. A first driver 221 has an input coupled to the first transmitter input 201 and an output coupled to a first transmitter output 211 by means of a first transmitter resistive element 231. A second driver 222 has an input coupled to the second transmitter input 202 and an output coupled to a second transmitter output 212 by means of a second transmitter resistive element 232. A third driver 223 has an input coupled to the third transmitter input 203 and an output coupled to a third transmitter output 213 by means of a third transmitter resistive element 233. The first transmitter output 211 is coupled to a first receiver input 101 by means of the first wire Z. The second transmitter output 212 is coupled to a second receiver input 102 by means of the second wire Y. The third transmitter output 213 is coupled to a third receiver input 103 by means of the third wire X. The first, second and third transmitter resistive elements 231, 232, 233 preferably each have the same resistance.

The receiver 100 comprises a first detection stage D1, a second detection stage D2 and a third detection stage D3. The first detection stage D1 comprises a first detection resistive element R1 coupled between the first receiver input 101 and a common node 120, and a first comparator C1 having a first, non-inverting input 121 coupled to the first receiver input 101 and a second, inverting input 122 coupled to the common node 120. An output 131 of the first comparator C1 is coupled to a first receiver output 111 for delivering a first received bit $Z_{RX}$. The second detection stage D2 comprises a second detection resistive element R2 coupled between the second receiver input 102 and the common node 120, and a second comparator C2 having a first, non-inverting input 123 coupled to the second receiver input 102 and a second, inverting input 124 coupled to the common node 120. An output 132 of the second comparator C2 is coupled to a second receiver output 112 for delivering a second received bit $Y_{RX}$. The third detection stage D3 comprises a third detection resistive element R3 coupled between the third receiver input 103 and the common node 120, and a third comparator C3 having a first, non-inverting input 125 coupled to the third receiver input 103 and a second, inverting input 126 coupled to the common node 120. An output 133 of the third comparator C3 is coupled to a third receiver output 113 for delivering a third received bit $X_{RX}$. The first, second and third detection resistive elements R1, R2, R3 have an equal, or substantially equal resistance, in other words, a common or substantially common resistance, which may be the same as, or different from, a resistance of the first, second and third transmitter resistive elements 231, 232, 233.

In operation, the first transmit bit $Z_{TX}$, second transmit bit $Y_{TX}$ and third transmit bit $X_{TX}$ of a symbol to be transmitted are applied to, respectively, the first, second and third transmitter inputs 201, 202, 203. In response to the first transmit bit $Z_{TX}$, the first driver 221 establishes a first signalling voltage $V_Z$ at the first transmitter output 211 which causes a first signalling current $I_Z$ to flow in the first wire Z. In response to the second transmit bit $Y_{TX}$, the second driver 222 establishes a second signalling voltage $V_Y$ at the second transmitter output 212 which causes a second signalling current $I_Y$ to flow in the second wire Y. In response to the third transmit bit $X_{TX}$, the third driver 223 establishes a third signalling voltage $V_X$ at the third transmitter output 213 which causes a third signalling current $I_X$ to flow in the third wire X.

Up to six different symbols may be transmitted by the signalling system 300 described with reference to FIG. 3. In the table of FIG. 4, the six columns numbered 1 to 6 represent six states of the signalling system 300 that correspond to the six available values of the symbol transmitted across the three-wire digital interface 350. There are six permutations of binary values, 0 or 1, for the first, second and third transmit bits $Z_{TX}$, $Y_{TX}$, $X_{TX}$, where for each of the permutations, two of the first, second and third transmit bits $Z_{TX}$, $Y_{TX}$, $X_{TX}$ have the same binary value, and the third one of the first, second and third transmit bits $Z_{TX}$, $Y_{TX}$, $X_{TX}$ has a different binary value. Therefore, all six permutations include both binary values, and the first, second and third transmit bits $Z_{TX}$, $Y_{TX}$, $X_{TX}$ are excluded from all having the same binary value, either 1 or 0.

Values of the first, second and third signalling voltages $V_Z$, $V_Y$, $V_X$ are indicated in FIG. 4, having a value V in response to the respective first, second and third transmit bits $Z_{TX}$, $Y_{TX}$, $X_{TX}$ being a binary 1, and having a value −V in response to the respective first, second and third transmit bits $Z_{TX}$, $Y_{TX}$, $X_{TX}$ being a binary 0.

Similarly, values of the first, second and third signalling currents $I_Z$, $I_Y$, $I_X$ are indicated in FIG. 4, having a magnitude I in both of the first, second and third wires Z, Y, X, which have a common signalling voltage applied, either both V or both −V, and a magnitude 2I in the other of the first, second and third wires Z, Y, X, which has a different signalling voltage. The polarity of the first, second and third signalling currents $I_Z$, $I_Y$, $I_X$ follows the polarity of the respective first, second and third signalling voltages $V_Z$, $V_Y$, $V_X$, with a positive value indicating flow of current from the transmitter 200 to the receiver 100, and a negative value indicating flow of current from the receiver 100 to the transmitter 200.

For the signalling system 300 of FIG. 3, I=(2V)/(3R), where R is the resistance of the first, second and third detection resistive elements R1, R2, R3. In all six states, current is either sourced into two of the first, second and third receiver inputs 101, 102, 103 and is sunk out of the other of the first, second and third receiver inputs 101, 102, 103, or is sunk out of two of the first, second and third receiver inputs 101, 102, 103 and is sourced into the other of the first, second and third receiver inputs 101, 102.

First, second and third comparator voltages $V_{CZ}$, $V_{CY}$, $V_{CX}$ indicated in FIG. 4 are established between the first inputs 121, 123, 125 and second inputs 122, 124, 126 of the respective first, second and third comparators C1, C2, C3 by the respective first, second and third signalling currents $I_Z$, $I_Y$, $I_X$, where a positive value indicates a relatively high voltage, and a negative value indicates a relatively low voltage, at the first, non-inverting inputs 121, 123, 125, of the first, second and third comparators C1, C2, C3. The smallest voltage to be detected by the first, second and third comparators C1, C2, C3 has a magnitude 2V/3, and this enables a high immunity to noise. The first, second and third comparators C1, C2, C3 deliver at their respective outputs 131, 132, 133 the first, second and third received bits $Z_{RX}$, $Y_{RX}$, $X_{RX}$ having a binary value, 1 or 0, dependent on the polarity, positive or negative, of the respective first, second and third comparator voltages $V_{CZ}$, $V_{CY}$, $V_{CX}$, as indicated in FIG. 4.

In one example, the voltage V may be 200 milliVolts, with −V being −200 milliVolts, and the resistance of the first, second and third detection resistive elements R1, R2, R3 may be 50 ohms. In this case, the current I is 2.66 mA.

Although an embodiment of a signalling system 300 comprising a three-wire digital interface 350 has been described in which values of the first, second and third signalling voltages $V_Z$, $V_Y$, $V_X$ are selected from V and −V, it is not essential for the first, second and third signalling voltages $V_Z$, $V_Y$, $V_X$ to have an equal magnitude, or to have opposite polarity for representing different binary values. More generally, values of the first, second and third signalling voltages $V_Z$, $V_Y$, $V_X$ may be selected from any two non-equal values $V_1$ and $V_2$.

Where $V_1 > V_2$, the voltage at the common node 120 varies, depending on the value of the symbol being transmitted, between $(V_1-V_2)/3$ and $2(V_1-V_2)/3$. A low variation in this voltage can facilitate low timing skew in changes of the first, second and third signalling voltages $V_Z$, $V_Y$, $V_X$, which can facilitate high speed operation of the signalling system 300. Moreover, when the signalling system 300 is implemented in an integrated circuit, the common node 120 is a local node inside the integrated circuit, and no significant amount of current is charged or discharged from the parasitic capacitances connected to the common node 120, thereby avoiding any significant degradation in eye opening of the signals conveyed between the transmitter 200 and receiver 100.

Figure 5:
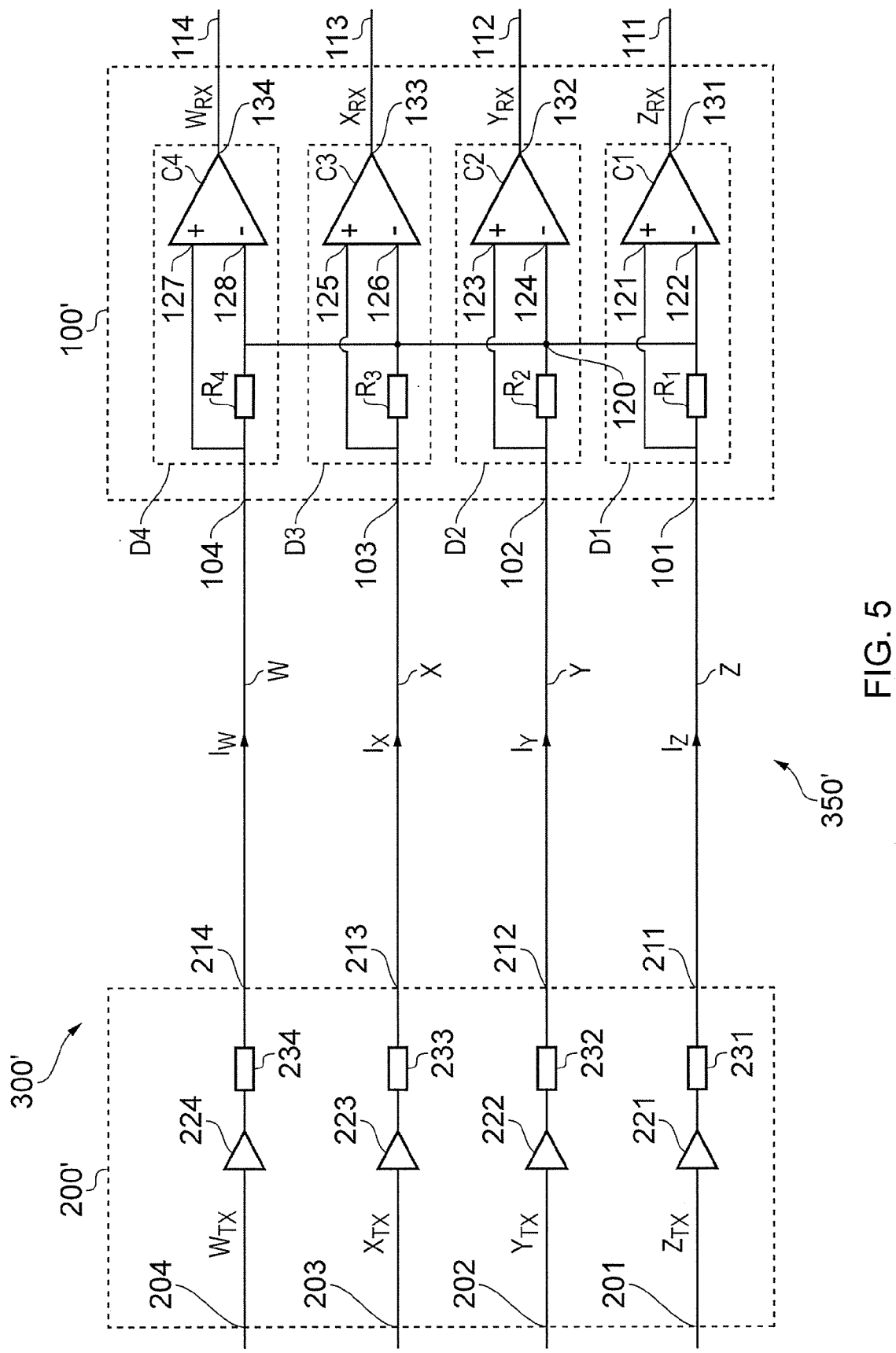
FIG. 5 is a schematic diagram of a signalling system comprising a four-wire digital interface.

Referring to FIG. 5, there is illustrated a signalling system 300' comprising a transmitter 200' and receiver 100' coupled by means of a four-wire digital interface 350' comprising first, second, third and fourth wires Z, Y, X, W. The transmitter 200' illustrated in FIG. 5 comprises all the elements of the transmitter 200 illustrated in, and described with reference to FIG. 3, coupled together in the manner described, and operational in the manner described, but additionally comprises a fourth transmitter input 204 for a fourth transmit bit $W_{TX}$ of a symbol to be transmitted, a fourth driver 224 having an input coupled to the fourth transmitter input 204 and an output coupled to a fourth transmitter output 214 by means of a fourth transmitter resistive element 234. The fourth transmitter resistive element 234 may have a resistance equal to, or substantially equal to, the resistance of the first, second and third transmitter resistive elements 231, 232, 233. In response to the fourth transmit bit $W_{TX}$, the fourth driver 224 establishes a fourth signalling voltage $V_W$ at the fourth transmitter output 214, dependent on the binary value of the fourth transmit bit $W_{TX}$ supplied at the fourth transmitter input 204, which causes a fourth signalling current $I_W$ to flow in the fourth wire W.

Similarly, the receiver 100' illustrated in FIG. 5 comprises all the elements of the receiver 100 illustrated in, and described with reference to FIG. 3, coupled together in the manner described, and operational in the manner described, but additionally comprises a fourth receiver input 104 coupled to the fourth transmitter output 214 by means of the fourth wire W, and a fourth detection stage D4 coupled to the fourth receiver input 104 and the common node 120. The fourth detection stage D4 comprises a fourth detection resistive element R4 coupled between the fourth receiver input 104 and the common node 120, and a fourth comparator C4 having a first, non-inverting input 127 coupled to the fourth receiver input 104, a second, inverting input 128 coupled to the common node 120. An output of the fourth comparator C4 is coupled to a fourth receiver output 114 for delivering a fourth received bit $W_{RX}$. The fourth detection resistive element R4 has a resistance equal to, or substantially equal to, the resistance of the first, second and third detection resistive elements R1, R2, R3.

Up to fourteen different symbols may be transmitted by the signalling system 300' described with reference to FIG. 5. In the table of FIG. 6, the fourteen columns numbered 1 to 14 represent fourteen states of the signalling system 300' that correspond to the fourteen available values of the symbol transmitted across the four-wire digital interface 350'. There are fourteen permutations of binary values, 0 or 1, for the first, second, third and fourth transmit bits $Z_{TX}$, $Y_{TX}$, $X_{TX}$, $W_{TX}$ where each of the permutations include both binary values. Therefore, the first, second, third and fourth transmit bits $Z_{TX}$, $Y_{TX}$, $X_{TX}$, $W_{TX}$ are excluded from all having the same binary value, either 1 or 0.

Values of the first, second, third and fourth signalling voltages $V_Z$, $V_Y$, $V_X$, $V_W$ are indicated in FIG. 6, having a value V in response to the respective first, second, third and fourth transmit bits $Z_{TX}$, $Y_{TX}$, $X_{TX}$, $W_{TX}$ being a binary 1, and having a value –V in response to the respective first, second, third and fourth transmit bits $Z_{TX}$, $Y_{TX}$, $X_{TX}$, $W_{TX}$ being a binary 0.

Values of the first, second, third and fourth signalling currents $I_Z$, $I_Y$, $I_X$, $I_W$ are indicated in FIG. 6, having a magnitude 21 when only two of the first, second, third and fourth wires Z, Y, X, W have a common signalling voltage applied, either both V or both –V, and the other two of the first, second, third and fourth wires Z, Y, X, W have the other binary value signalling voltage applied, correspondingly either –V or V. The polarity of the first, second, third and fourth signalling currents $I_Z$, $I_Y$, $I_X$, $I_W$ follows the polarity of the respective first, second, third and fourth signalling voltages $V_Z$, $V_Y$, $V_X$, $V_W$, with a positive value indicating flow of current from the transmitter 200' to the receiver 100', and a negative value indicating flow of current from the receiver 100' to the transmitter 200'.

When three of the first, second, third and fourth wires Z, Y, X, W have a common signalling voltage applied, either all V or all –V, the other one of the first, second, third and fourth wires Z, Y, X, W has the other binary value signalling voltage applied, correspondingly either –V or V. In this case, the three of the first, second, third and fourth wires Z, Y, X, W which have a common signalling voltage applied convey respective signalling currents of magnitude I, and the other one of the first, second, third and fourth wires Z, Y, X, W which has the other binary value signalling voltage applied conveys a respective signalling current of magnitude 31. Again, the polarity of the first, second, third and fourth signalling currents $I_Z$, $I_Y$, $I_X$, $I_W$ follows the polarity of the respective first, second, third and fourth signalling voltages $V_Z$, $V_Y$, $V_X$, $V_W$, with a positive value indicating flow of current from the transmitter 200 to the receiver 100, and a negative value indicating flow of current from the receiver 100 to the transmitter 200.

For the four-wire digital interface of FIG. 5, I=V/(2R), where R is the resistance of the first, second, third and fourth detection resistive elements R1, R2, R3, R4. In all fourteen states, current is either sourced into one, two or three of the first, second, third and fourth receiver inputs 101, 102, 103, 104 and is sunk out of the other respective three, two or one of the first, second, third and fourth receiver inputs 101, 102, 103, 104, or is sunk out of one, two or three of the first, second, third and fourth receiver inputs 101, 102, 103, 104 and is sourced into the other respective three, two or one of the first, second, third and fourth receiver inputs 101, 102, 103, 104.

First, second, third and fourth comparator voltages $V_{CZ}$, $V_{CY}$, $V_{CX}$, $V_{CW}$ indicated in FIG. 6 are established between the first inputs 121, 123, 125, 127 and second inputs 122, 124, 126, 128 of the respective first, second, third and fourth comparators C1, C2, C3, C4 by the respective first, second, third and fourth signalling currents $I_Z$, $I_Y$, $I_X$, $I_W$, where a positive value indicates a relatively high voltage, and a negative value indicates a relatively low voltage, at the first, non-inverting inputs 121, 123, 125, 127 of the first, second, third and fourth comparators C1, C2, C3, C4. The smallest voltage to be detected by the first, second, third and fourth comparators C1, C2, C3, C4 has a magnitude V/2, and this enables a high immunity to noise. The first, second, third and fourth comparators C1, C2, C3, C4 deliver at their respective outputs 131, 132, 133, 134 the first, second, third and fourth received bits $Z_{RX}$, $Y_{RX}$, $X_{RX}$, $W_{RX}$ having a binary value, 1 or 0, dependent on the polarity, positive or negative, of the respective first, second, third and fourth comparator voltages $V_{CZ}$, $V_{CY}$, $V_{CX}$, $V_{CW}$, as indicated in FIG. 6.

Although an embodiment of a signalling system 300' comprising a four-wire digital interface 350' has been described in which values of the first, second, third and fourth signalling voltages $V_Z$, $V_Y$, $V_X$, $V_W$ are selected from V and –V, it is not essential for the first, second, third and fourth signalling voltages $V_Z$, $V_Y$, $V_X$, $V_W$ to have an equal magnitude, or to have opposite polarity for representing different binary values. More generally, values of the first, second, third and fourth signalling voltages $V_Z$, $V_Y$, $V_X$, $V_W$ may be selected from any two non-equal values $V_1$ and $V_2$.

For states 1 to 6 illustrated in FIG. 6, the voltage at the common node 120 is identical, being midway between the values V and –V of the first to fourth signalling voltages $V_Z$, $V_Y$, $V_X$, $V_W$, and so does not vary when changing between any of states 1 to 6. Therefore, timing skew in changes of the first, second, third and fourth signalling voltages $V_Z$, $V_Y$, $V_X$, $V_W$ is minimised when changing between any of states 1 to 6. For states 7 to 14 illustrated in FIG. 6, the voltage at the common node 120 varies, depending on the value of the symbol being transmitted, between $(V_1-V_2)/4$ and $3(V_1-$ $V_2$)/4, where $V_1 > V_2$. Again, a low variation in this voltage can facilitate low timing skew in changes of the first, second, third and fourth signalling voltages $V_Z$, $V_Y$, $V_X$, $V_W$, which can facilitate high speed operation of the signalling system 300'. Likewise, when the signalling system 300' is implemented in an integrated circuit, the common node 120 is a local node inside the integrated circuit, and no significant amount of current is charged or discharged from the parasitic capacitances connected to the common node, thereby avoiding any significant degradation in eye opening of the signals conveyed between the transmitter 200' and receiver 100'.

Figure 7:
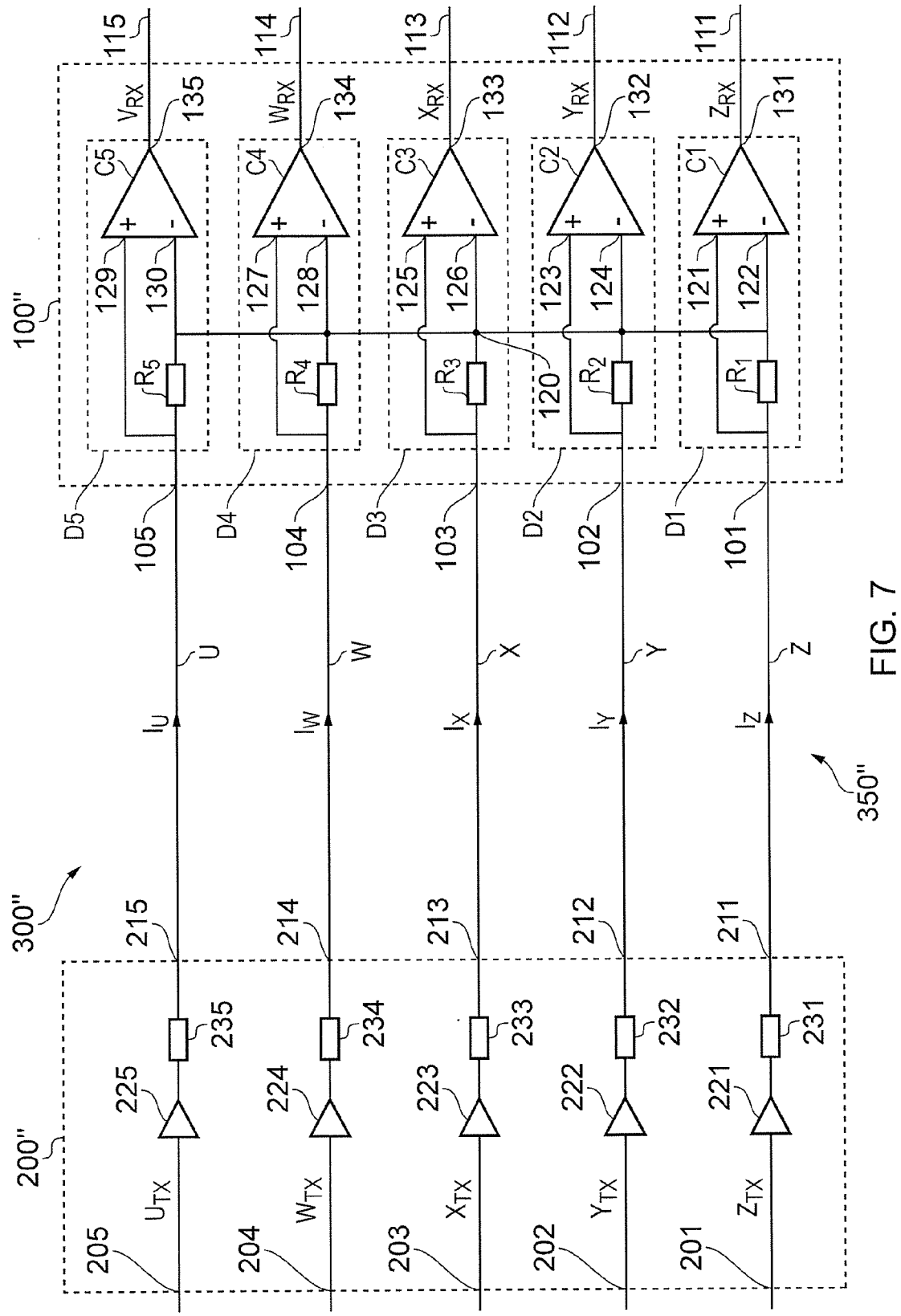
FIG. 7 is a schematic diagram of a signalling system comprising a five-wire digital interface.

Referring to FIG. 7, there is illustrated a signalling system 300" comprising a transmitter 200" and receiver 100" coupled together by means of a five-wire digital interface 300". The five-wire digital interface 300" comprises first, second, third, fourth and fifth wires Z, Y, X, W, U. The transmitter 200" illustrated in FIG. 7 comprises all the elements of the transmitter 200' illustrated in, and described with reference to FIG. 5, coupled together in the manner described, and operational in the manner described, but additionally comprises a fifth transmitter input 205 for a fifth transmit bit $U_{TX}$ of a symbol to be transmitted, a fifth driver 225 having an input coupled to the fifth transmitter input 205 and an output coupled to a fifth transmitter output 215 by means of a fifth transmitter resistive element 235. The fifth transmitter resistive element 235 may have a resistance equal to, or substantially equal to, the resistance of the first, second, third and fourth transmitter resistive elements 231, 232, 233, 234. In response to the fifth transmit bit $U_{RX}$, the fifth driver 225 establishes a fifth signalling voltage $V_U$ at the fifth transmitter output 215, dependent on the binary value of the fifth transmit bit $U_{RX}$ supplied at the fifth transmitter input 205, which causes a fifth signalling current $I_U$ to flow in the fifth wire U.

Similarly, the receiver 100" illustrated in FIG. 7 comprises all the elements of the receiver 100' illustrated in, and described with reference to FIG. 5, coupled together in the manner described, and operational in the manner described, but additionally comprises a fifth receiver input 105 coupled to the fifth transmitter output 215 by means of the fifth wire U, and a fifth detection stage D5 coupled to the fifth receiver input 105 and the common node 120. The fifth detection stage D5 comprises a fifth detection resistive element R5 coupled between the fifth receiver input 105 and the common node 120, and a fifth comparator C5 having a first, non-inverting input 129 coupled to the fifth receiver input 105, a second, inverting input 130 coupled to the common node 120. An output of the fifth comparator C5 is coupled to a fifth receiver output 115 for delivering a fifth received bit $U_{RX}$. The fifth detection resistive element R5 has a resistance equal to, or substantially equal to, the resistance of the first, second, third and fourth detection resistive elements R1, R2, R3, R4.

Up to twenty different symbols may be transmitted by the signalling system 300" described with reference to FIG. 7. In the table of FIG. 8, the twenty columns numbered 1 to 20 represent twenty states of the signalling system 300" that correspond to the twenty available values of the symbol transmitted across the five-wire digital interface 350". There are twenty permutations of binary values, 0 or 1, for the first, second, third, fourth and fifth transmit bits $Z_{TX}$, $Y_{TX}$, $X_{TX}$, $W_{TX}$, $U_{TX}$ where each of the permutations include both binary values 0 and 1. More particularly, each of the permutations include three instances of either one of the binary values 0 and 1, and two instances of the other of the binary values. Therefore, the first, second, third, fourth and fifth transmit bits $Z_{TX}$, $Y_{TX}$, $X_{TX}$, $W_{TX}$, $U_{TX}$ are, in this embodiment, excluded from all having the same binary value, either 1 or 0, and are excluded from having a single binary 1 and from having a single binary 0.

Values of the first, second, third, fourth and fifth signalling voltages $V_Z$, $V_Y$, $V_X$, $V_W$, $V_U$ are indicated in FIG. 8, having a value V in response to the respective first, second, third, fourth and fifth transmit bits $Z_{TX}$, $Y_{TX}$, $X_{TX}$, $W_{TX}$, $U_{TX}$ being a binary 1, and having a value -V in response to the respective first, second, third, fourth and fifth transmit bits $Z_{RX}$, $Y_{TX}$, $X_{TX}$, $W_{TX}$, $U_{TX}$ being a binary 0.

Values of the first, second, third, fourth and fifth signalling currents $I_Z$, $I_Y$, $I_X$, $I_W$, $I_U$ are indicated in FIG. 8, having a magnitude 21 for those three of the first, second, third, fourth and fifth wires Z, Y, X, W, U which have a common signalling voltage applied, either all V or all -V, and a magnitude 31 for the other two of the first, second, third, fourth and fifth wires Z, Y, X, W, U which have the other binary value signalling voltage applied, correspondingly either -V or V. The polarity of the first, second, third, fourth and fifth signalling currents $I_Z$, $I_Y$, $I_X$, $I_W$, $I_U$ follows the polarity of the respective first, second, third, fourth and fifth signalling voltages $V_Z$, $V_Y$, $V_X$, $V_W$, $V_U$, with a positive value indicating flow of current from the transmitter 200" to the receiver 100", and a negative value indicating flow of current from the receiver 100" to the transmitter 200".

For the five-wire digital interface of FIG. 7, I=(2V)/(5R), where R is the resistance of the first, second, third, fourth and fifth detection resistive elements R1, R2, R3, R4, R5. In all twenty states, current is either sourced into two or three of the first, second, third, fourth and fifth receiver inputs 101, 102, 103, 104, 105 and is sunk out of the other respective three or two of the first, second, third, fourth and fifth receiver inputs 101, 102, 103, 104, 105, or is sunk out of two or three of the first, second, third, fourth and fifth receiver inputs 101, 102, 103, 104, 105 and is sourced into the other respective three or two of the first, second, third, fourth and fifth receiver inputs 101, 102, 103, 104, 105. First, second, third, fourth and fifth comparator voltages $V_{CZ}$, $V_{CY}$, $V_{CX}$, $V_{CW}$, $V_{CU}$ indicated in FIG. 8 are established between the first inputs 121, 123, 125, 127, 129 and second inputs 122, 124, 126, 128, 130 of the respective first, second, third, fourth and fifth comparators C1, C2, C3, C4, C5 by the respective first, second, third, fourth and fifth signalling currents $I_Z$, $I_Y$, $I_X$, $I_W$, $I_U$ where a positive value indicates a relatively high voltage, and a negative value indicates a relatively low voltage, at the first, non-inverting inputs 121, 123, 125, 127, 129 of the first, second, third, fourth and fifth comparators C1, C2, C3, C4, C5. The smallest voltage to be detected by the first, second, third, fourth and fifth comparators C1, C2, C3, C4, C5 has a magnitude 4V/5, indicating a lower immunity to noise than the signalling systems 300, 300' comprising the three-wire or four-wire digital interfaces 350, 350'. The first, second, third, fourth and fifth comparators C1, C2, C3, C4, C5 deliver at their respective outputs 131, 132, 133, 134, 135 the first, second, third, fourth and fifth received bits $Z_{RX}$, $Y_{RX}$, $X_{RX}$, $W_{RX}$, $V_{RX}$ having a binary value, 1 or 0, dependent on the polarity, positive or negative, of the respective first, second, third, fourth and fifth comparator voltages $V_{CZ}$, $V_{CY}$, $V_{CX}$, $V_{CW}$, $V_{CU}$, as indicated in FIG. 8.

Although an embodiment of a signalling system 300" comprising a five-wire digital interface 350" has been described in which values of the first, second, third, fourth and fifth signalling voltages $V_Z$, $V_Y$, $V_X$, $V_W$, $V_U$ are selected from V and -V, it is not essential for the first, second, third, fourth and fifth signalling voltages $V_Z$, $V_Y$, $V_X$, $V_W$, $V_U$ to have an equal magnitude, or to have opposite polarity for representing different binary values. More generally, values of the first, second, third, fourth and fifth signalling voltages $V_Z$, $V_Y$, $V_X$, $V_W$, $V_U$ may be selected from any two non-equal values $V_1$ and $V_2$.

For all states 1 to 20 illustrated in FIG. 8, the voltage at the common node 120 varies, depending on the value of the symbol being transmitted, between $2(V_1-V_2)/5$ and $3(V_1-V_2)/5$, where $V_1 > V_2$. This variation of voltage at the common node 120 is lower than in the case of the signalling system 300 comprising the three-wire digital interface 350, and can facilitate low timing skew in changes of the first, second, third, fourth and fifth signalling voltages $V_Z$, $V_Y$, $V_X$, $V_W$, $V_U$, which can facilitate high speed operation on the five-wire digital interface 350".

Figure 9:
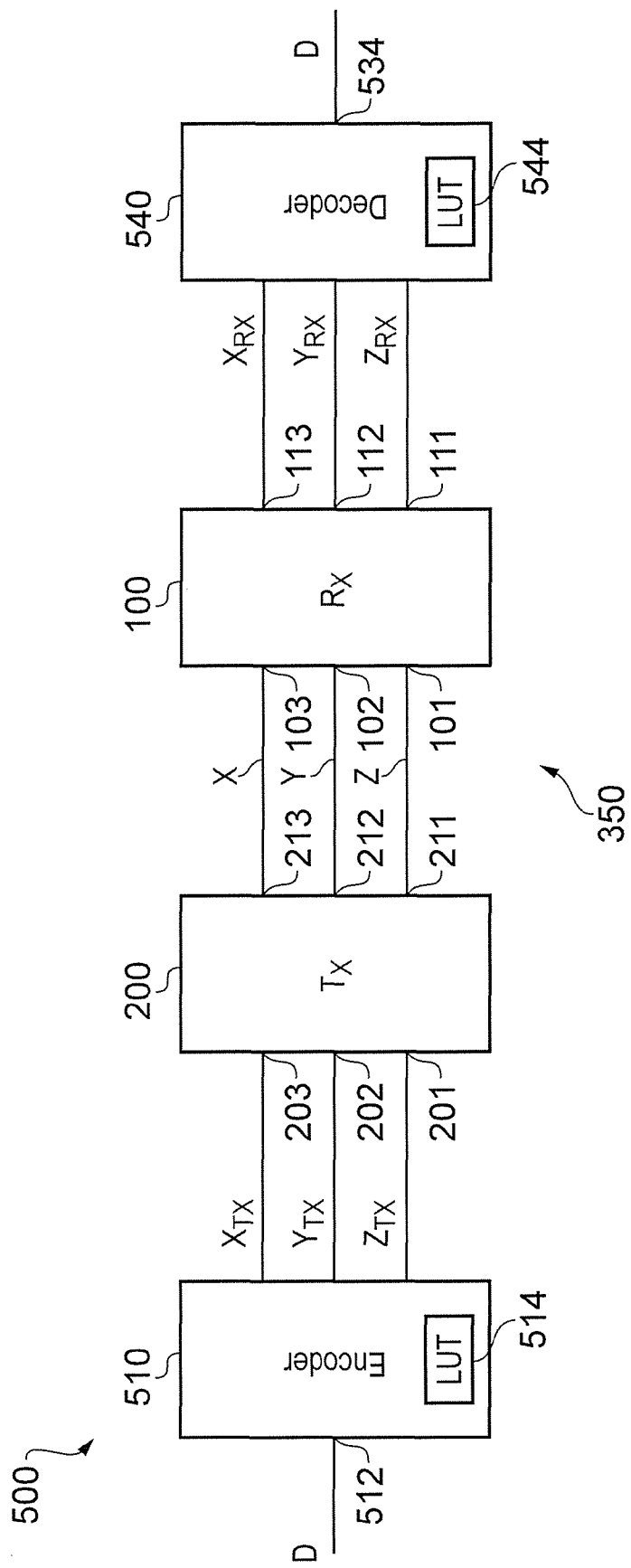
FIG. 9 is a schematic diagram of a signalling system.

Although an embodiment of a receiver for a five-wire digital interface has been disclosed in which the first to fifth transmit bits $Z_{TX}$, $Y_{TX}$, $X_{TX}$, $W_{TX}$, $U_{TX}$ are excluded from having a single binary 1 and from having a single binary 0, this is not an essential limitation. In other embodiments of a five-wire digital interface, more than twenty states of the first to fifth comparators C1 . . . C5 may be employed, enabling more than twenty symbols to be received. This entails employing values for the first to fifth transmit bits $Z_{RX}$, $Y_{TX}$, $X_{TX}$, $W_{TX}$, $U_{RX}$ which have a single binary 1 or a single binary 0, and correspondingly permitting four of the first to fifth signalling voltages $V_Z$, $V_Y$, $V_X$, $V_W$, $V_U$ to have the same value and only the fifth one of the first to fifth signalling voltages $V_Z$, $V_Y$, $V_X$, $V_W$, $V_U$ to have a different value. In this case, the first to fifth comparator voltages $V_{CZ}$, $V_{CY}$, $V_{CX}$, $V_{CW}$, $V_{CU}$ can take smaller values than the values indicated in the table of FIG. 8, and therefore the noise immunity of such a receiver is lower than for the receiver 100" used for receiving twenty symbols. Referring to FIG. 9, a signalling system 500 employing a three-wire digital interface 350 comprises an encoder 510, the transmitter 200 coupled to the receiver 100 by means of a first, second and third wire Z, Y, X, and a decoder 540. The encoder 510 has an input 512 for data symbols D. Each data symbol corresponds to a different one of the six states illustrated in FIG. 4. The encoder 510 employs a look-up table (LUT) 514 comprising the three rows of the table of FIG. 4 that map the six states corresponding to data symbols to the first, second and third transmit bits $Z_{TX}$, $Y_{TX}$, $X_{TX}$. The encoder 510 is coupled to the first, second and third inputs 201, 202, 203 of the transmitter 200 for delivering the first, second and third transmit bits $Z_{TX}$, $Y_{TX}$, $X_{TX}$ to the transmitter 200 for transmission. Operation, and interconnection, of the transmitter 200 and receiver 100 are as described above with reference to FIG. 3. The decoder 540 is coupled to the first, second and third outputs 111, 112, 113 of the receiver 100 for receiving the first, second and third received bits $Z_{RX}$, $Y_{RX}$, $X_{RX}$. The decoder 540 employs a look-up table 544 comprising the three rows of the table of FIG. 4 that map the first, second and third received bits $Z_{RX}$, $Y_{RX}$, $X_{RX}$ to the six states corresponding to data symbols, and delivers at an output 534 a data symbol correspond to each decoded state. Although the encoder 510 has been presented as a separate entity from the transmitter 200, alternatively, the encoder 510 may be incorporated within the transmitter 200. Similarly, although the decoder 540 has been presented as a separate entity from the receiver 100, alternatively, the decoder 540 may be incorporated within the receiver 100.

With the six available states, up to $\log_2(6)$ bits~2.58 bits can be transmitted in each symbol period. By employing DDR, thereby permitting the data to change at both the rising and falling edges of a clock signal, up to $2 \log_2(6)$ bits~5.17 bits can be transmitted in each clock cycle. In another embodiment, the signalling system 500 may employ the four-wire digital interface 350' using the transmitter 200' and receiver 100' described with reference to FIG. 5, in which case, with fourteen states available, up to $\log_2(14)$ bits~3.81 bits can be transmitted in each symbol period, or 7.61 bits with DDR. In a further embodiment, the signalling system 500 may employ the five-wire digital interface 350" using the transmitter 200" and receiver 100" described with reference to FIG. 7, in which case, with twenty states available, up to $\log_2(20)$ bits~4.32 bits can be transmitted in each symbol period, or 8.64 bits with DDR.

It is not essential for all of the available states to be employed to represent data symbols. For example, with the five-wire digital interface 350", sixteen of the twenty states may be used to represent data symbols, with each of these data symbols representing four bits of data, and four of the twenty states may be used to represent control symbols, such as INIT, for initialising a receiving terminal, START, for initiating communication of data, END, for terminating communication of data, and REPEAT, signifying that the data represented by the previously transmitted data symbol is repeated. This REPEAT control symbol can be used to ensure that there is a change of voltage or current in at least one of the first, second, third, fourth and fifth wires Z, Y, X, W, U at the beginning of every data symbol period, which can facilitate clock extraction from the received symbols.

Although the transmitters 200, 200', 200" and receivers 100, 100' and 100' are adapted for transmitting and receiving, respectively, six, fourteen and twenty states they may be employed for transmitting and receiving fewer states. For example, in the case of the four-wire interface, the states employed may be limited to those that correspond to the largest comparator voltages $V_{CZ}$, $V_{CY}$, $V_{CX}$, $V_{CW}$, namely states one to six in FIG. 6. These six states also provide a constant voltage at the common node. Therefore, these states enable high speed and low timing skew, and generate least interference.

Although embodiments of a receiver for a three-wire, a four-wire and a five-wire digital interface have been disclosed, the disclosure is not limited to these numbers of wires, and more wires can be used. In general, the selection of the number of wires N and the number of states is a trade-off between signalling speed and noise immunity, the latter being dependent on the minimum comparator voltage to be detected. In a further embodiment, twenty-four states can be provided on a six-wire digital interface in which, for all twenty-four states, three of the wires convey signalling voltages having a first value $V_1$, and the other three wires convey signalling voltages having a second, different value $V_2$. Such an embodiment would provide a common noise immunity for all twenty-four states. Alternatively, where six wires are available, two three-wire digital interfaces can be provided using two of the signalling systems 300 described with reference to FIG. 3, each providing six states, and therefore a total of up to thirty six states, but with a lower noise immunity.

Figure 10:
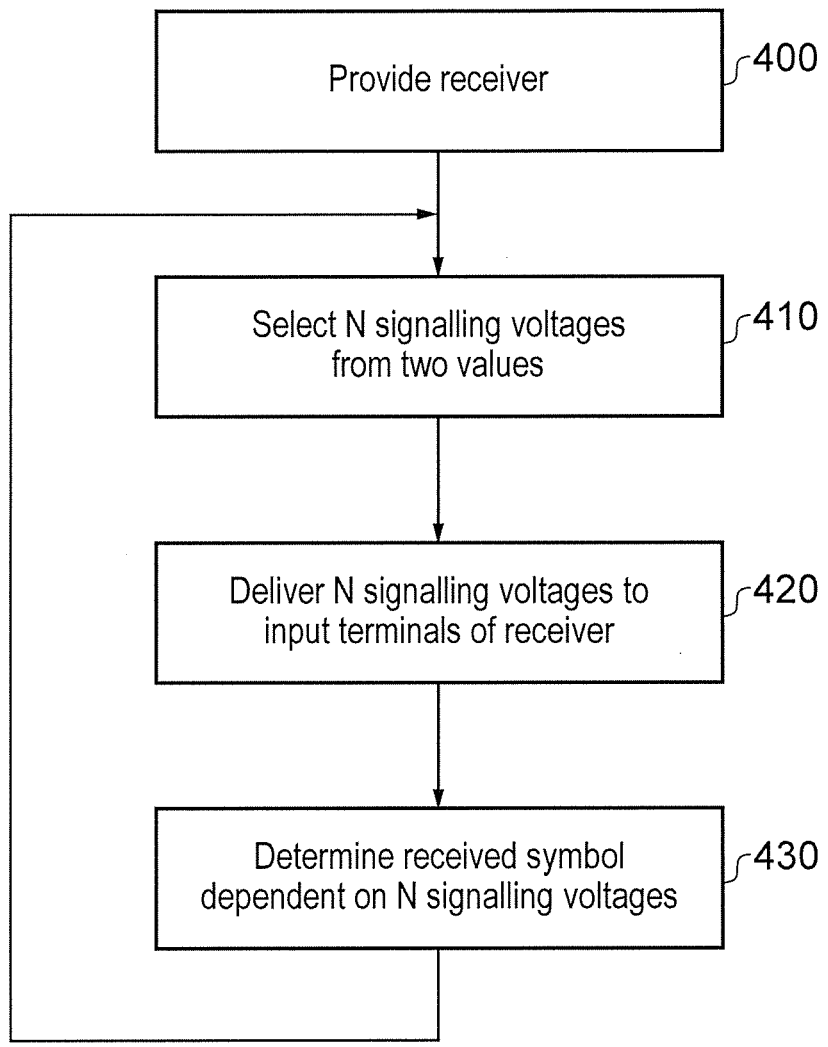
FIG. 10 is flow chart of a method of operating a signalling system.

Suitable voltages for the non-equal values $V_1$ and $V_2$ from which the first, second, third, fourth and fifth signalling voltages $V_Z$, $V_Y$, $V_X$, $V_W$, $V_U$ may be selected are dependent on the application for which the receivers 100, 100' and 100" are used. As the voltage difference between $V_1$ and $V_2$ decreases, comparator delay may increase, and analogue noise can result in unacceptable timing jitter in signals transmitted over the N-wire interface. Typically, in applications employing clock speeds around 1 GHz or faster, a voltage difference between $V_1$ and $V_2$ of not less than 100 mV may be preferable. Referring to FIG. 10, a method of operating an N-wire digital interface comprises, at step 400, providing a receiver such as one of the receivers 100, 100', 100" described with reference to, respectively, FIGS. 3, 5 and 7, and executing a plurality of passes of a loop comprising steps 410, 420 and 430. Each pass of step 410 comprises selecting N signalling voltages, wherein each of the N signalling voltages is selected from two values. Each pass of step 420 comprises delivering the selected N signalling voltages to the respective N input terminals of the receiver, and each pass of step 430 comprises determining a received symbol dependent on the N signalling voltages.

In a first preferred embodiment of the method, N is three, the receiver is the receiver 100 described with reference to FIG. 3, two of the three signalling voltages have the same value and a third one of the three signalling voltages has a different value. In a second preferred embodiment of the method, N is four, the receiver is the receiver 100' described with reference to FIG. 5, at least two of the four signalling voltages have the same value and the at least one other of the four signalling voltages has a different value. In a third preferred embodiment, N is five, the receiver is the receiver 100" described with reference to FIG. 7, three of the five signalling voltages have the same value and the other two of the five signalling voltages have a different value.

Figure 11:
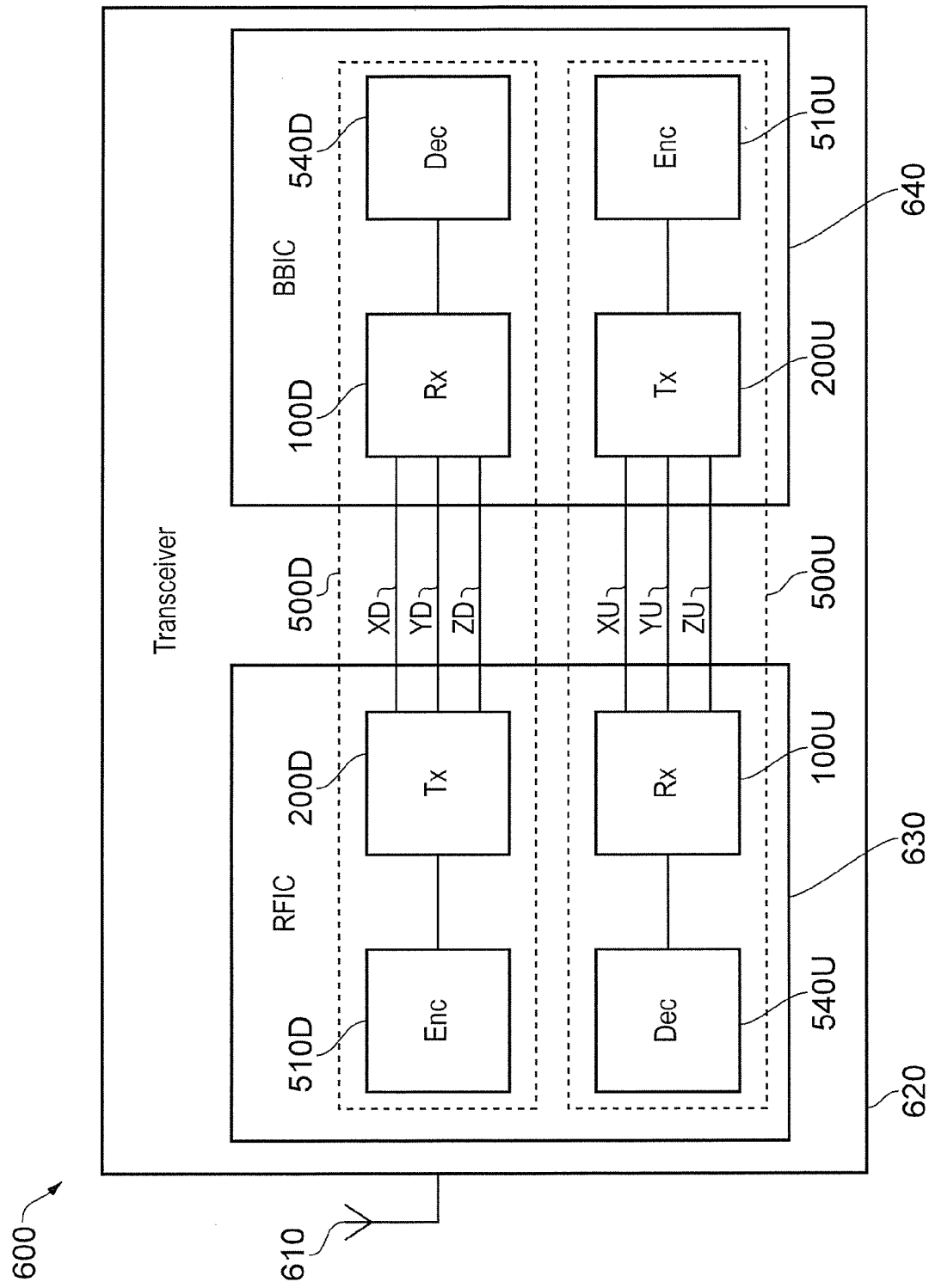
FIG. 11 is a schematic diagram of a wireless communication device.

Referring to FIG. 11, a wireless communication device 600 comprises an antenna 610 coupled to a transceiver 620. The transceiver 620 comprises an RF integrated circuit (RFIC) 630 coupled to a baseband integrated circuit (BBIC) 640. The signalling system 500 described with reference to FIG. 9 is employed for communication between the RFIC 630 and the BBIC 640, and conveys downlink information, that is, information received by the wireless communication device 600, and is referred to below as a downlink signalling system and is referenced 500D in FIG. 11. Elements of the downlink signalling system 500D have the same reference numerals as the elements of the signalling system 500 of FIG. 9 with an additional suffix D. Therefore, the downlink signalling system 500D comprises, in the RFIC 630, an encoder 510D coupled a transmitter 200D, and, in the BBIC 640, a receiver 100D coupled to a decoder 540D. The transmitter 200D and the receiver 100D are coupled by means of three wires ZD, YD, XD.

Another instance of the signalling system 500 described with reference to FIG. 9 is employed for communication between the RFIC 630 and the BBIC 640, and conveys uplink information, that is, information transmitted from the wireless communication device 600, and is referred to below as an uplink signalling system and is referenced 500U in FIG. 11. Elements of the uplink signalling system 500U have the same reference numerals as the elements of the signalling system 500 of FIG. 9 with an additional suffix U. Therefore, the uplink signalling system 500U comprises, in the BBIC 640, an encoder 510U coupled a transmitter 200U, and, in the RFIC 640, a receiver 100U coupled to a decoder 540U. The transmitter 320U and the receiver 100U are coupled by means of three wires ZU, YU, XU.

Although the disclosure is described with reference to LTE and digital interface standards specified by the MIPI Alliance, the disclosure is not limited to these standards but has application to other digital interfaces. Similarly, although the disclosure is described with reference to a wireless communication device, the disclosure is not limited to such a device, but has application to other electronic devices incorporating a digital interface.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A receiver comprising:
   N input terminals, where N is any integer exceeding two;
   a common node; and
   N detection stages, each of the N detection stages including:
   a resistive element, each of the resistive elements coupled between the common node and a respective one of the N input terminals; and
   a comparator, each of the comparators having a first input coupled directly to a respective one of the N input terminals and a second input coupled directly to the common node, wherein the resistive element of each of the N detection stages has a same resistance value.

2. The receiver as claimed in claim 1, further comprising:
   a decoder coupled to comparator outputs of the N detection stages and configured to determine a received symbol dependent on states of the comparator outputs.

3. The receiver as claimed in claim 2, wherein the decoder comprises a first look-up table for mapping the states of the comparator outputs to the received symbol.

4. The receiver as claimed in claim 1, wherein N is one of: three, four and five.

5. A signaling system comprising:
   a transmitter configured to generate N signaling voltages applied to wires of an N-wire interface, respectively, each of the N signaling voltages being indicative of a different one of N bits to be transmitted, and having a value selected from two values; and
   a receiver having N input terminals, a common node, and N detection stages, where N is any integer exceeding two, each of the N detection stages including:
   a resistive element, each of the resistive elements coupled between the common node and a respective one of the N input terminals; and
   a comparator, each of the comparators having a first input coupled directly to a respective one of the N input terminals and a second input coupled directly to the common node,
   wherein the resistive element of each of the N detection stages has a same resistance value, and the N input terminals are coupled to the wires of the N-wire interface, respectively.

6. The signaling system as claimed in claim 5, further comprising an encoder configured to map a symbol to the N bits to be transmitted.

7. The signaling system as claimed in claim 6, wherein the encoder comprises a second look-up table for mapping the symbol to the N bits to be transmitted.

8. The signaling system as claimed in claim 5, wherein N is three, and wherein two of the N signaling voltages have a first value and a third one of the N signaling voltages has a second value, which is different from the first value.

9. The signaling system as claimed in claim 5, wherein N is four, and wherein at least two of the N signaling voltages have a first value and the at least one other of the N signaling voltages has a second value, which is different from the first value.

10. The signaling system as claimed in claim 5, wherein N is five, and wherein three of the N signaling voltages have a first value and two of the N signaling voltages have a second value, which is different from the first value.

11. A method of operating a signaling system, the method comprising:
 providing a receiver having N input terminals, a common node, and N detection stages, where N is any integer exceeding two, each of the N detection stages including:
  a resistive element, each of the resistive elements coupled between the common node and a respective one of the N input terminals; and
  a comparator, each of the comparators having a first input coupled directly to a respective one of the N input terminals and a second input coupled directly to the common node, wherein the resistive element of each of the N detection stages has a same resistance value;
 selecting N signaling voltages, wherein each of the N signaling voltages is selected from two values;
 delivering the N signaling voltages to the N input terminals of the receiver, respectively; and
 determining a received symbol dependent on the N signaling voltages.

12. The method as claimed in claim 11, wherein N is three, and wherein two of the N signaling voltages have a first value and a third one of the N signaling voltages has a second value, which is different from the first value.

13. The method as claimed in claim 11, wherein N is four, wherein at least two of the N signaling voltages have a first value and at least one other of the N signaling voltages has a second value, which is different from the first value.

14. The method as claimed in claim 11, wherein N is five, and wherein three of the N signaling voltages have a first value and two of the N signaling voltages have a second, which is value different from the first value.

15. A wireless communication device comprising:
 a transmitter configured to generate N signaling voltages applied to wires of an N-wire interface, respectively, each of the N signaling voltages being indicative of a different one of N bits to be transmitted, and having a value selected from two values; and
 a receiver having N input terminals, a common node, and N detection stages, where N is any integer exceeding two, each of the N detection stages including:
  a resistive element, each of the resistive elements coupled between the common node and a respective one of the N input terminals; and
  a comparator, each of the comparators having a first input coupled directly to a respective one of the N input terminals and a second input coupled directly to the common node,
 wherein the resistive element of each of the N detection stages has a same resistance value, and the N input terminals are coupled to the wires of the N-wire interface, respectively.

* * * * *